(12) United States Patent  (10) Patent No.: US 9,107,067 B2
Kim  (45) Date of Patent: Aug. 11, 2015

(54) SECURED COMMUNICATION

(75) Inventor: Seungil Kim, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 29 days.

(21) Appl. No.: 13/996,724

(22) PCT Filed: Sep. 11, 2012

(86) PCT No.: PCT/US2012/054608
§ 371 (c)(1),
(2), (4) Date: Jun. 21, 2013

(87) PCT Pub. No.: WO2014/042615
PCT Pub. Date: Mar. 20, 2014

(65) Prior Publication Data
US 2014/0165144 A1  Jun. 12, 2014

(51) Int. Cl.
*H04L 9/32* (2006.01)
*H04W 12/02* (2009.01)
*H04K 3/00* (2006.01)

(52) U.S. Cl.
CPC .............. *H04W 12/02* (2013.01); *H04K 3/228* (2013.01); *H04K 3/28* (2013.01); *H04K 3/825* (2013.01); *H04K 3/43* (2013.01); *H04K 2203/36* (2013.01)

(58) Field of Classification Search
CPC ....... G06F 21/30; G06F 21/60; G06F 21/606; H04L 9/00; H04L 9/001; H04K 3/825; H04K 3/43; H04K 2203/36; H04B 1/0475

USPC .............. 726/2–4, 27, 30; 380/268, 270; 455/67.13, 114.2
See application file for complete search history.

(56) References Cited

U.S. PATENT DOCUMENTS

| | | | | |
|---|---|---|---|---|
| 4,044,359 A | * | 8/1977 | Applebaum et al. | 342/379 |
| 4,241,454 A | | 12/1980 | Snell et al. | |
| 4,628,320 A | * | 12/1986 | Downie | 342/16 |
| 5,014,309 A | * | 5/1991 | West, Jr. | 380/209 |
| RE34,004 E | | 7/1992 | Rogoff et al. | |
| 5,493,307 A | * | 2/1996 | Tsujimoto | 342/380 |
| 6,647,250 B1 | * | 11/2003 | Bultman et al. | 455/102 |
| 2004/0142670 A1 | | 7/2004 | Ciccarelli | |
| 2005/0047493 A1 | | 3/2005 | Underbrink et al. | |
| 2009/0093211 A1 | | 4/2009 | Chu et al. | |
| 2011/0086590 A1 | | 4/2011 | Johnson et al. | |

OTHER PUBLICATIONS

International Search Report from International Application No. PCT/US12/54608 mailed Apr. 15, 2013.
"Position-based Jamming for Enhanced Wireless Secrecy" by J. Vilela, et al., Mar. 2011, 29 pages.
"Artifical Noise Generation from Cooperative Relays for Everlasting Secrecy in Two-Hop Wireless Networks" by D. Goeckel, et al., 10 pages.

* cited by examiner

*Primary Examiner* — Hosuk Song
(74) *Attorney, Agent, or Firm* — Brundidge & Stanger, P.C.

(57) ABSTRACT

Technologies are generally described for providing secured communications. In some examples, a method performed under control of a first device may include transmitting a jamming signal, receiving a mixed signal that includes the jamming signal and an information signal generated by a second device and obtaining the information signal by eliminating the jamming signal from the mixed signal.

26 Claims, 6 Drawing Sheets

SECURED COMMUNICATION

CROSS-REFERENCE TO RELATED APPLICATION

This Application is the National Stage filing under 35 U.S.C. §371 of PCT Application Ser. No. PCT/US2012/054608, filed on Sep. 11, 2012.

BACKGROUND

Multiple devices communicate with each other utilizing wireless communication networks such as third generation (3G) and fourth generation (4G) mobile telecommunications technologies and Wi-Fi wireless access technologies. However, security for the wireless communication networks has drawn intense scrutiny.

SUMMARY

In an example, a method performed under control of a first device may include transmitting a jamming signal, receiving a mixed signal that includes the jamming signal and an information signal generated by a second device, and obtaining the information signal by eliminating the jamming signal from the mixed signal.

In another example, a first device may include a jamming signal identifying unit configured to identify a jamming signal, a transmitting unit configured to transmit the jamming signal, a receiving unit configured to receive a mixed signal that includes the jamming signal and an information signal generated by a second device and a jamming signal canceling unit configured to eliminate the jamming signal from the mixed signal.

In yet another example, a computer-readable storage medium may store thereon computer-executable instructions that, in response to execution, cause a first device to perform operations, including transmitting a jamming signal, receiving a mixed signal that includes the jamming signal and an information signal generated by a second device and obtaining the information signal by eliminating the jamming signal from the mixed signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to a secured communication scheme.

Technologies are generally described for a method for providing communication between multiple devices with enhanced security.

In some embodiments, a transmitter may transmit an information signal to a receiver to communicate with the receiver. Further, there could be an eavesdropper who is utilizing one or more devices to eavesdrop on the communication between the transmitter and the receiver. By way of example, but not limitation, the one or more devices may include a directional antenna. The receiver may generate a jamming signal such as a noise signal or random signal. In such cases, the receiver may transmit the jamming signal while the transmitter is transmitting the information signal to the receiver. Then, the information signal transmitted from the transmitter and the jamming signal transmitted from the receiver may be mixed into a mixed signal.

The receiver may receive the mixed signal in which the information signal and the jamming signal are mixed and the eavesdropper may also receive the mixed signal. In such cases, since the receiver already knows the jamming signal, the receiver can eliminate the jamming signal from the mixed signal. Accordingly, the receiver may obtain the information signal by eliminating the jamming signal from the mixed signal. Since the eavesdropper does not know the jamming signal, the eavesdropper cannot identify the information from the mixed signal. Accordingly, although there is an eavesdropper who is utilizing one or more devices to eavesdrop on the communication between the transmitter and receiver, the transmitter and receiver may communicate with each other with enhanced security.

Figure 1:
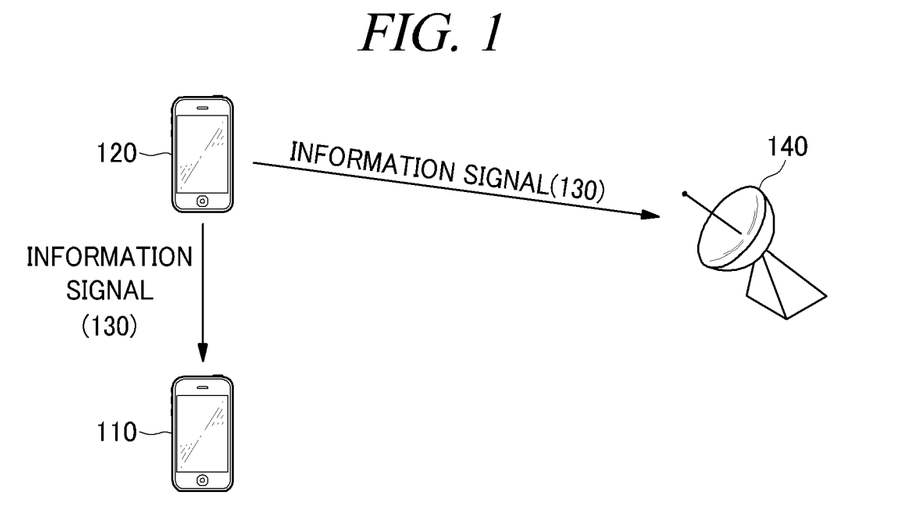
FIG. 1 schematically shows an illustrative example of a conventional wireless data communication environment including a first device, a second device and an eavesdropper.

FIG. 1 schematically shows an illustrative example of a conventional wireless data communication environment including a first device, a second device and an eavesdropper.

As illustrated in FIG. 1, a first device 110 and a second device 120 communicate with each other and an information signal 130, which is to be transmitted from second device 120 to first device 110, may also be transmitted to an eavesdropper 140. By way of example, but not limitation, eavesdropper 140 may include a directional antenna and thus, eavesdropper 140 may eavesdrop on the communication between first device 110 and second device 120.

Figure 2A:
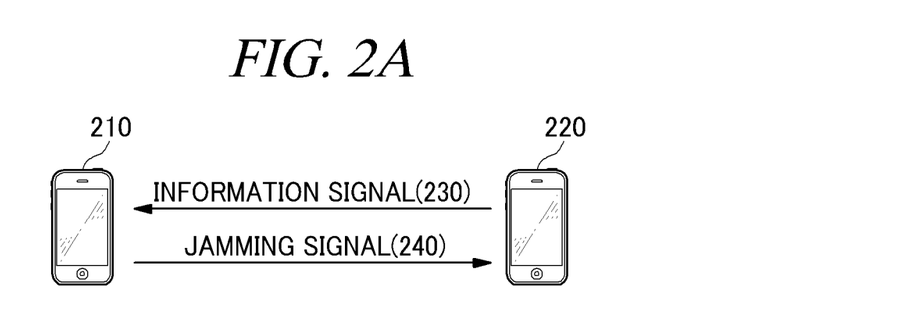
FIG. 2A schematically shows an illustrative example of a wireless data communication environment in which a first device and a second device communicate with each other, arranged in accordance with at least some embodiments described herein.
Figure 2B:
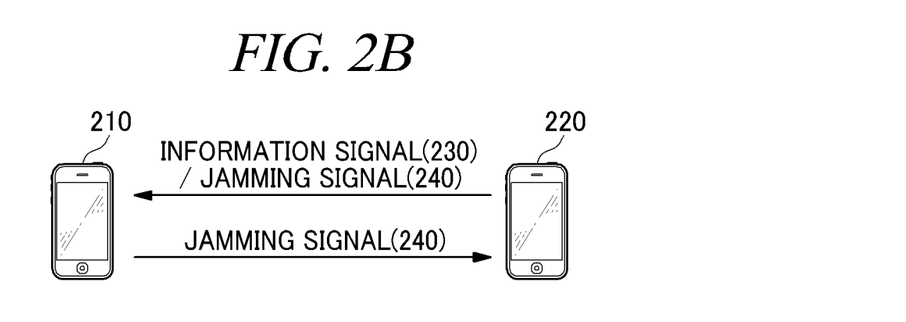
FIG. 2B schematically shows another illustrative example of a wireless data communication environment in which a first device and a second device communicate with each other, arranged in accordance with at least some embodiments described herein.

FIG. 2A schematically shows an illustrative example of a wireless data communication environment in which a first device and a second device communicate with each other, arranged in accordance with at least some embodiments described herein. FIG. 2B schematically shows another illustrative example of a wireless data communication environment in which a first device and a second device communicate with each other, arranged in accordance with at least some embodiments described herein.

As illustrated in FIGS. 2A and 2B, a first device 210 may receive an information signal 230 generated by, and transmitted from, a second device 220. By way of example, first device 210 and second device 220 may respectively include, but are not limited to, a personal communication terminal, such as PCS (Personal Communication System), GMS (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminals.

As illustrated in FIG. 2A, first device 210 may generate and identify a jamming signal 240. For example, first device 210 may assign an identifier to the generated jamming signal 240 and store the identifier in first device 210. By way of example, but not limitation, jamming signal 240 may include a random signal or a noise signal.

As illustrated in FIG. 2B, second device 220 may generate and provide jamming signal 240 to first device 210 and then, first device 210 may receive and identify jamming signal 240 provided by second device 220. For example, first device 210 may assign an identifier to jamming signal 240 provided from second device 220 and store the identifier in first device 210.

As illustrated in FIGS. 2A and 2B, first device 210 may transmit the identified jamming signal 240 to the air (but not necessarily to second device 220) and in some cases, the identified jamming signal 240 transmitted from first device 210 may be received by second device 220. Then, information signal 230 transmitted from second device 220 and jamming signal 240 transmitted from first device 210 may be mixed in the air to produce a mixed signal.

First device 210 may receive the mixed signal in which information signal 230 transmitted from second device 220 and jamming signal 240 transmitted from first device 210 are mixed. Then, since the identity for jamming signal 240 has been stored for first device 210, first device 210 may identify and eliminate jamming signal 240 from the mixed signal and thus extract information signal 230 using adaptive noise canceling. Accordingly, first device 210 may obtain information signal 230 transmitted from second device 220 in a secured manner.

Figure 3:
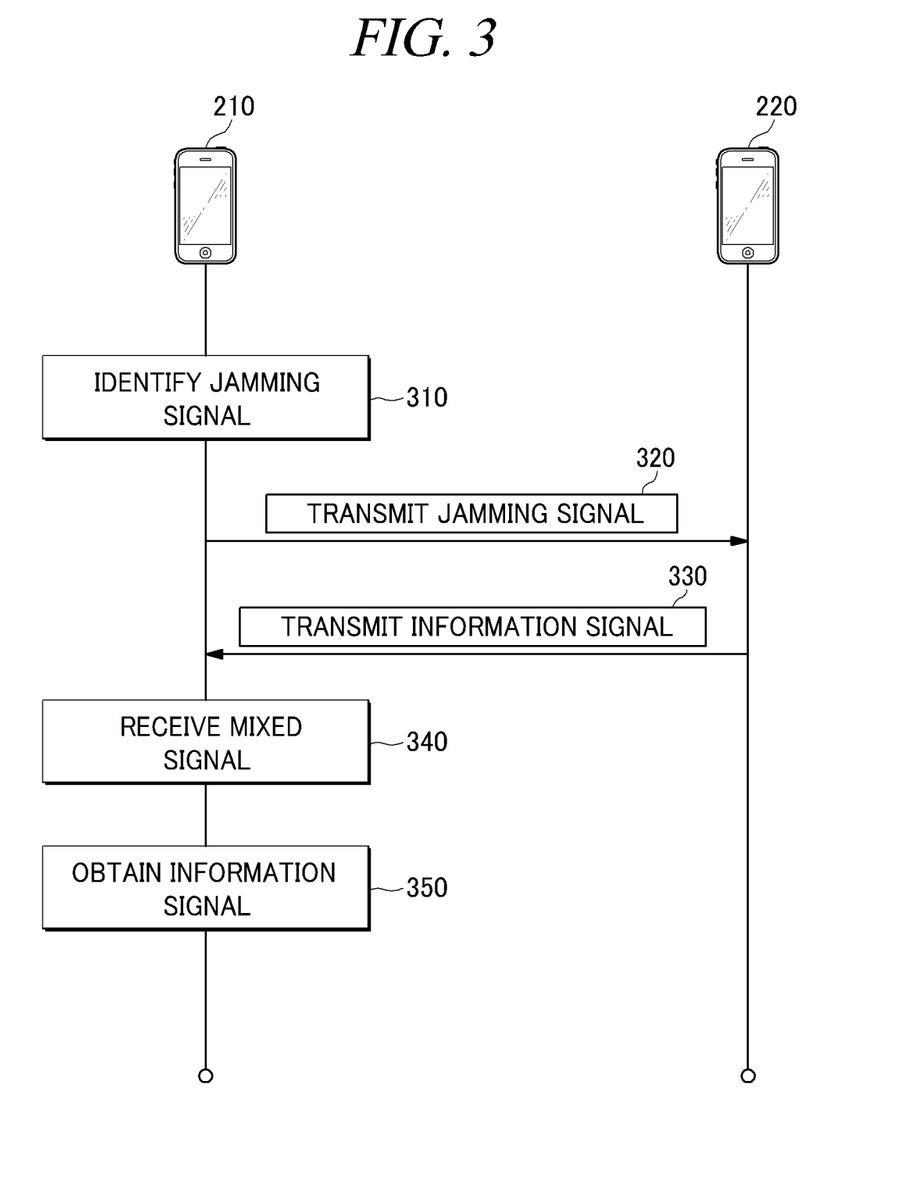
FIG. 3 schematically shows an example signal flow diagram of a process between a first device and a second device, arranged in accordance with at least some embodiments described herein.

FIG. 3 schematically shows an example signal flow diagram of a process between a first device and a second device, arranged in accordance with at least some embodiments described herein. The process in FIG. 3 may be implemented in the wireless data communication environment including first device 210 and second device 220, as illustrated in FIGS. 2A and 2B. An example process may include one or more operations, actions, or functions as illustrated by one or more blocks 310, 320, 330, 340 and/or 350. Although illustrated as discrete blocks, various blocks may be divided into additional blocks, combined into fewer blocks, or eliminated, depending on the desired implementation. Processing may begin at block 310.

At block 310 (Identify Jamming Signal), in some embodiments, first device 210 may generate and identify jamming signal 240. For example, first device 210 may assign an identifier to the generated jamming signal 240 and store the identifier in first device 210. In some other embodiments, second device 220 may generate and provide jamming signal 240 to first device 210 and then, first device 210 may receive and identify jamming signal 240 provided by second device 220. For example, first device 210 may assign an identifier to jamming signal 240 provided from second device 220 and store the identifier in first device 210. Processing may proceed from block 310 to block 320.

At block 320 (Transmit Jamming Signal), first device 210 may transmit the identified jamming signal 240 to the air and the identified jamming signal 240 may be received by second device 220. By way of example, but not limitation, jamming signal 240 may include a random signal or a noise signal. Processing may proceed from block 320 to block 330.

At block 330 (Transmit Information Signal), second device 220 may generate information signal 230 and transmit information signal 230 to first device 210. Then, information signal 230 transmitted from second device 220 and jamming signal 240 transmitted from first device 210 may be mixed in the air to produce a mixed signal. Processing may proceed from block 330 to block 340.

At block 340 (Receive Mixed Signal), first device 210 may receive a mixed signal in which information signal 230 transmitted from second device 220 and jamming signal 240 transmitted from first device 210 are mixed. Processing may proceed from block 340 to block 350.

At block 350 (Obtain Information Signal), first device 210 may obtain information signal 230 by identifying and eliminating jamming signal 240 from the mixed signal. As first device 210 identifies jamming signal 240, first device 210 may eliminate jamming signal 240 from the mixed signal to extract information signal 230 using adaptive noise canceling.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
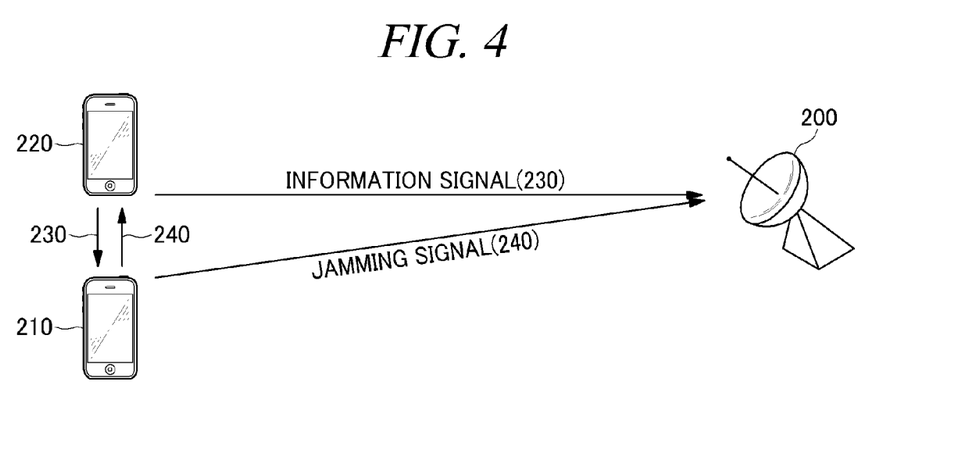
FIG. 4 schematically shows an illustrative example of a wireless data communication environment including a first device, a second device and an eavesdropper, arranged in accordance with at least some embodiments described herein.

FIG. 4 schematically shows an illustrative example of a wireless data communication environment including a first device, a second device and an eavesdropper, arranged in accordance with at least some embodiments described herein. As illustrated in FIG. 4, first device 210 may broadcast jamming signal 240, and second device 220 may transmit information signal 230 to first device 210 while first device 210 broadcasting jamming signal 240. Accordingly, first device 210 may receive a mixed signal in which information signal 230 and jamming signal 240 are mixed.

As illustrated in FIG. 4, information signal 230 and jamming signal 240 may be intercepted by an eavesdropper 200. In some embodiments, eavesdropper 200 may be a directional antenna. Such directional antenna may have a property of angular resolution, which may be defined as an ability of a device (in the above case, the directional antenna) to distinguish small details such as direction(s) to the device, distance(s) from the device, of object(s) (in the example of FIG. 4., first device 210 and second device 220). In such cases, if a distance between first device 210 and second device 220 is shorter than a distance between first device 210 and/or eavesdropper 200, eavesdropper 200 may not be able to distinguish between first device 210 and second device 220. In such cases, eavesdropper 200 may mistakenly recognize first device 210 and second device 220 to be one device. Thus, it may not be easy for eavesdropper 200 to extract information signal 230 from the mixed signal that includes information signal 230 from second device 220 and jamming signal 240 from first device 210.

As first device 210 is able to identify jamming signal 240, first device 210 may obtain information signal 230 by eliminating jamming signal 240 from the mixed signal using adaptive noise canceling. However, since eavesdropper 200 does not possess the identity of jamming signal 240, eavesdropper 200 may not be able to eliminate jamming signal 240 from the mixed signal. Accordingly, eavesdropper 200 cannot intercept information signal 230 in an intelligible manner.

Figure 5:
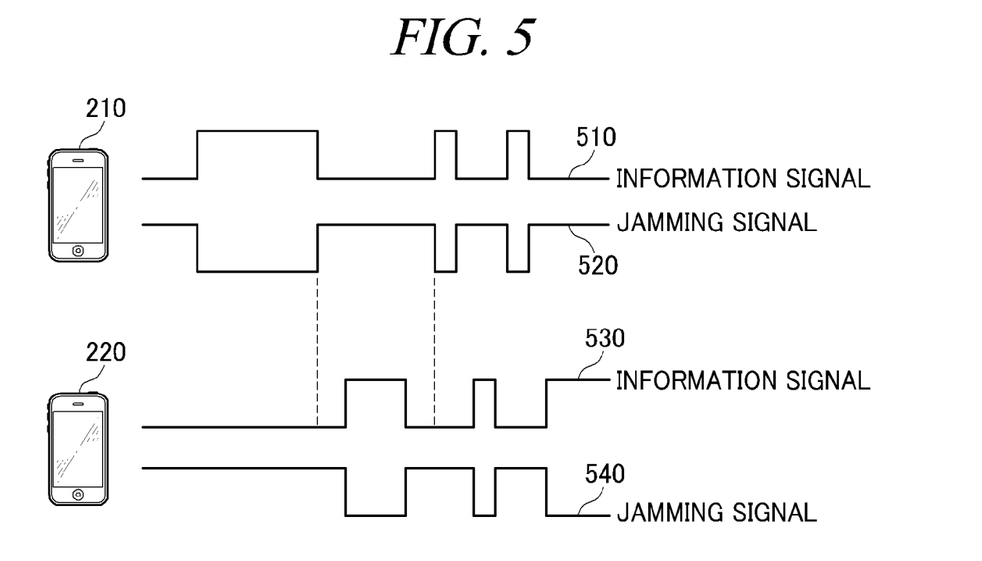
FIG. 5 schematically shows an example timing graph of information signals and jamming signals, arranged in accordance with at least some embodiments described herein.

FIG. 5 schematically shows an example timing graph of information signals and jamming signals, arranged in accordance with at least some embodiments described herein. As illustrated in FIG. 5, second device 220 may transmit an information signal 530 to first device 210 while first device 210 is transmitting a jamming signal 520. In some embodiments, second device 220 may start to transmit an information signal to first device 210 at the same time first device 210 starts to transmit a jamming signal.

Alternatively, as illustrated in FIG. 5, first device 210 may transmit an information signal 510 to second device 220 while second device 220 is transmitting a jamming signal 540. In some embodiments, first device 210 may start to transmit an information signal to second device 220 at the same time second device 220 starts to transmit a jamming signal.

Figure 6:
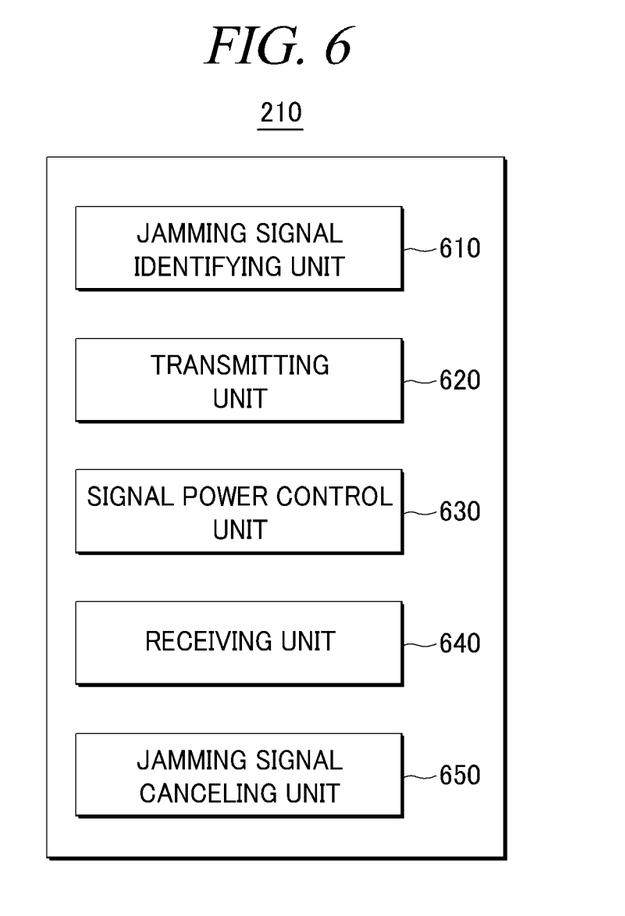
FIG. 6 shows a schematic block diagram illustrating an example architecture for a first device, arranged in accordance with at least some embodiments described herein.

FIG. 6 shows a schematic block diagram illustrating an example architecture for a first device, arranged in accordance with at least some embodiments described herein. As depicted in FIG. 6, first device 210 may include a jamming signal identifying unit 610, a transmitting unit 620, a signal power control unit 630, a receiving unit 640, and a jamming signal canceling unit 650. Although illustrated as discrete components, various components may be divided into additional components, combined into fewer components, or eliminated altogether while being contemplated within the scope of the disclosed subject matter.

Jamming signal identifying unit 610 may be configured to identify a jamming signal. In some embodiments, jamming signal identifying unit 610 may generate and identify the jamming signal. In some other embodiments, second device 220 may generate and provide the jamming signal to jamming signal identifying unit 610 and then, jamming signal identifying unit 610 may receive and identify the jamming signal generated by second device 220.

Transmitting unit 620 may be configured to transmit the identified jamming signal to the air and the identified jamming signal may be received by second device 220. Accordingly, the jamming signal transmitted by transmitting unit 620 and an information signal transmitted from second device 220 may be mixed in the air to produce a mixed signal.

Signal power control unit 630 may be configured to control a signal power of the jamming signal. In some embodiments, signal power control unit 630 may control at least one of elements such as, but not limitation, amplitude, frequency, bandwidth of the jamming signal. Transmitting unit 620 may transmit the jamming signal the signal power of which is controlled by signal power control unit 630.

Receiving unit 640 may be configured to receive the mixed signal in which the jamming signal transmitted by transmitting unit 620 and the information signal transmitted from second device 220 are mixed.

Jamming signal canceling unit 650 may be configured to eliminate the jamming signal from the mixed signal. In some embodiments, jamming signal canceling unit 650 may eliminate the jamming signal from the mixed signal using adaptive noise canceling. Accordingly, first device 210 may extract the information signal transmitted from second device 220.

Figure 7:
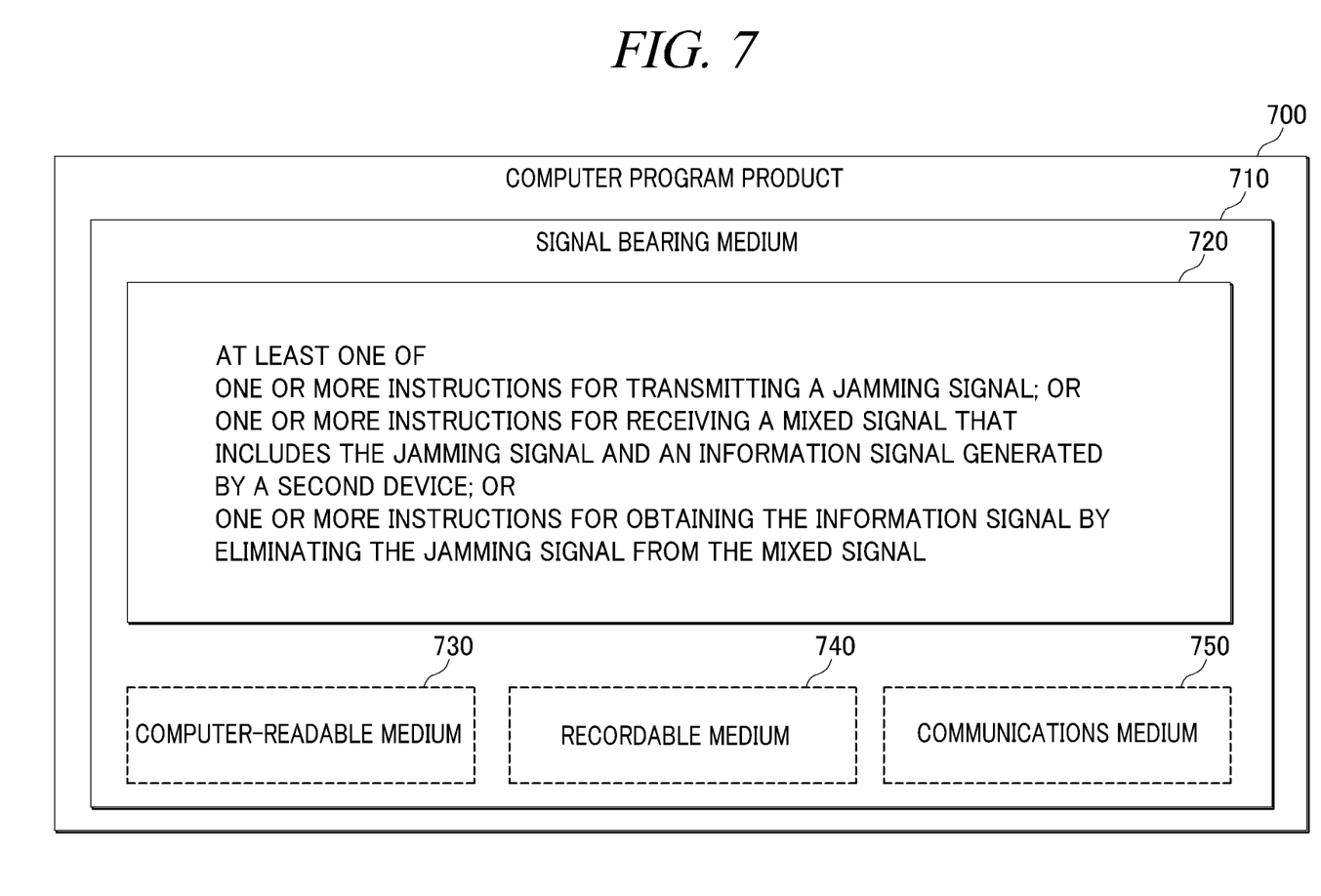
FIG. 7 illustrates computer program products that may be utilized to provide a scheme for providing secured communications, arranged in accordance with at least some embodiments described herein.

FIG. 7 illustrates computer program products that may be utilized to provide a scheme for providing secured communications, arranged in accordance with at least some embodiments described herein. Program product 700 may include a signal bearing medium 710. Signal bearing medium 710 may include one or more instructions 720 that, when executed by, for example, a processor, may provide the functionality described above with respect to FIGS. 2-6. By way of example, instructions 720 may include: one or more instructions for transmitting a jamming signal; one or more instructions for receiving a mixed signal that includes the jamming signal and an information signal generated by a second device; and one or more instructions for obtaining the information signal by eliminating the jamming signal from the mixed signal. Thus, for example, referring to FIG. 3, first device 210 may undertake one or more of the blocks shown in FIG. 3 in response to instructions 720.

In some implementations, signal bearing medium 710 may encompass a computer-readable medium 730, such as, but not limited to, a hard disk drive, a CD, a DVD, a digital tape, memory, etc. In some implementations, signal bearing medium 710 may encompass a recordable medium 740, such as, but not limited to, memory, read/write (R/W) CDs, R/W DVDs, etc. In some implementations, signal bearing medium 710 may encompass a communications medium 750, such as, but not limited to, a digital and/or an analog communication medium (e.g., a fiber optic cable, a waveguide, a wired communications link, a wireless communication link, etc.). Thus, for example, program product 700 may be conveyed to one or more modules of first device 210 by an RF signal bearing medium 710, where the signal bearing medium 710 is conveyed by a wireless communications medium 750 (e.g., a wireless communications medium conforming with the IEEE 802.11 standard).

Figure 8:
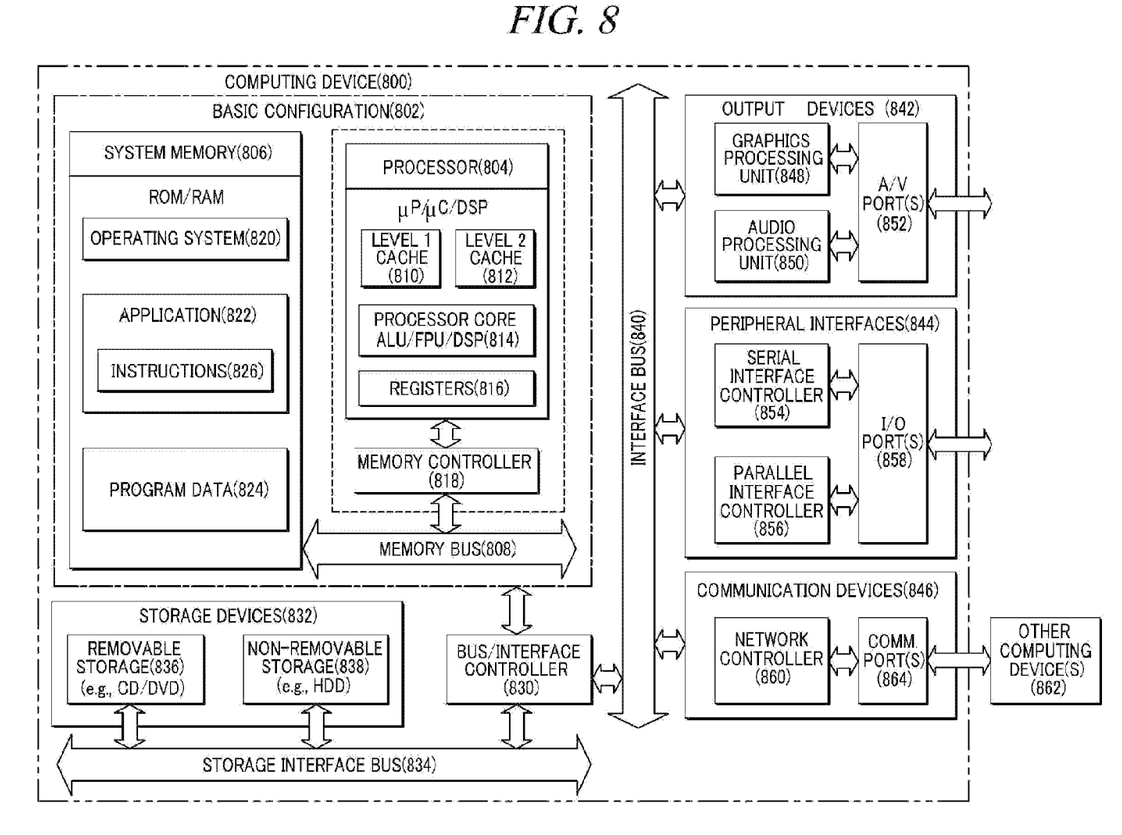
FIG. 8 is a block diagram illustrating an example computing device that may be utilized to provide a secured communication scheme, arranged in accordance with at least some embodiments described herein.

FIG. 8 is a block diagram illustrating an example computing device that may be utilized to provide a secured communication scheme, arranged in accordance with at least some embodiments described herein. In these examples, elements of computing device 800 may be arranged or configured for a device. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), nonvolatile memory (such as ROM, flash memory, etc.) or any combination thereof. System memory 806 may include an operating system 820, one or more applications 822, and program data 824.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a first device, comprising:
   transmitting, by the first device, a jamming signal;
   receiving, by the first device, a mixed signal that includes the jamming signal and an information signal generated by a second device; and
   obtaining, by the first device, the information signal by eliminating the jamming signal from the mixed signal.

2. The method of claim 1, further comprising:
   identifying, by the first device, the jamming signal before transmitting of the jamming signal.

3. The method of claim 2, wherein the jamming signal is generated by the first device.

4. The method of claim 2, wherein the jamming signal is generated by the second device and provided to the first device.

5. The method of claim 1, wherein the information signal is transmitted from the second device while the jamming signal is transmitted from the first device.

6. The method of claim 1, wherein a signal power of the jamming signal is controllable by the first device.

7. The method of claim 1, wherein the obtaining of the information signal is performed based at least in part on adaptive noise canceling.

8. The method of claim 1, wherein the jamming signal includes a random signal.

9. A first device, comprising:
   a jamming signal identifying unit configured to identify a jamming signal;
   a transmitting unit configured to transmit the jamming signal;
   a receiving unit configured to receive a mixed signal that includes the jamming signal and an information signal, the information signal being generated by a second device; and
   a jamming signal canceling unit configured to eliminate the jamming signal from the mixed signal.

10. The first device of claim 9, wherein the jamming signal is generated by the jamming signal identifying unit.

11. The first device of claim 9, wherein the jamming signal is generated by the second device and provided to the first device.

12. The first device of claim 9, wherein the information signal is transmitted from the second device while the jamming signal is transmitted from the first device.

13. The first device of claim 9, further comprising:
   a signal power control unit configured to control a signal power of the jamming signal.

14. The first device of claim 9, wherein the jamming signal canceling unit eliminates the jamming signal from the mixed signal based at least in part on adaptive noise canceling.

15. The first device of claim 9, wherein the jamming signal includes a random signal.

16. A non-transitory computer-readable storage medium having stored thereon computer-executable instructions that, in response to execution, cause a first device to perform operations comprising:
   transmitting, by the first device, a jamming signal;
   receiving, by the first device, a mixed signal that includes the jamming signal and an information signal generated by a second device; and obtaining, by the first device, the information signal by eliminating the jamming signal from the mixed signal.

17. The non-transitory computer-readable storage medium of claim 16, wherein the operations further comprise:
identifying, by the first device, the jamming signal before transmitting of the jamming signal.

18. The non-transitory computer-readable storage medium of claim 17, wherein the jamming signal is generated by the first device.

19. The non-transitory computer-readable storage medium of claim 16, wherein the information signal is transmitted from the second device while the jamming signal is transmitted from the first device.

20. The non-transitory computer-readable storage medium of claim 16, wherein the operations further comprise:
controlling, by the first device, a signal power of the jamming signal.

21. The method of claim 1, wherein the jamming signal is generated by the second device and provided to the first device.

22. The method of claim 1, further comprising:
assigning, by the first device, an identifier to the jamming signal before transmitting of the jamming signal; and
storing, by the first device, the identifier in the first device.

23. The non-transitory computer-readable storage medium of claim 16, wherein the operations further comprise:
assigning, by the first device, an identifier to the jamming signal before transmitting of the jamming signal; and
storing, by the first device, the identifier in the first device.

24. A first device, comprising:
a jamming signal identifying unit configured to assign an identifier to a jamming signal and to store the identifier in the first device;
a transmitting unit configured to transmit the jamming signal;
a receiving unit configured to receive a mixed signal that includes the jamming signal and an information signal, the information signal being generated by a second device; and
a jamming signal canceling unit configured to eliminate the jamming signal from the mixed signal.

25. The first device of claim 24, wherein the information signal is transmitted from the second device while the jamming signal is transmitted from the first device.

26. The first device of claim 24, wherein the jamming signal canceling unit eliminates the jamming signal from the mixed signal based at least in part on adaptive noise canceling.

* * * * *

UNITED STATES PATENT AND TRADEMARK OFFICE
CERTIFICATE OF CORRECTION

PATENT NO. : 9,107,067 B2  
APPLICATION NO. : 13/996724  
DATED : August 11, 2015  
INVENTOR(S) : Kim Page 1 of 1

It is certified that error appears in the above-identified patent and that said Letters Patent is hereby corrected as shown below:

On the Title Page, in Item (56), under "OTHER PUBLICATIONS", in Column 1, Line 5, delete ""Artifical" and insert -- Artificial --, therefor.

In The Drawings

In Fig. 8, Sheet 6 of 6, delete "  " and insert -- -- , therefor.

In The Specification

In Column 1, Line 7, delete "§371" and insert -- § 371 --, therefor.

Signed and Sealed this  
First Day of March, 2016

Michelle K. Lee  
*Director of the United States Patent and Trademark Office*